US012314302B2

(12) United States Patent
Witte et al.

(10) Patent No.: US 12,314,302 B2
(45) Date of Patent: May 27, 2025

(54) SYSTEMS AND METHODS FOR TIME-SERIES QUERY FOCUSED DOCUMENT SUMMARIZATION FROM MULTIPLE DOCUMENTS

(71) Applicant: Verizon Patent and Licensing Inc., Basking Ridge, NJ (US)

(72) Inventors: Carsten Witte, London (GB); Shade El-Hadik, New York, NY (US); Nicholas Adams-Cohen, San Jose, CA (US); Emanuel Munguia Tapia, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 317 days.

(21) Appl. No.: 18/047,942

(22) Filed: Oct. 19, 2022

(65) Prior Publication Data

US 2024/0134897 A1 Apr. 25, 2024
US 2024/0232241 A9 Jul. 11, 2024

(51) Int. Cl.
*G06F 40/289* (2020.01)
*G06F 16/34* (2019.01)
*G06F 16/383* (2019.01)
*G06F 40/242* (2020.01)

(52) U.S. Cl.
CPC .......... *G06F 16/345* (2019.01); *G06F 16/383* (2019.01); *G06F 40/242* (2020.01); *G06F 40/289* (2020.01)

(58) Field of Classification Search
None
See application file for complete search history.

(56) References Cited

U.S. PATENT DOCUMENTS

| 2003/0097357 | A1* | 5/2003 | Ferrari | G06F 16/954 |
| 2009/0010420 | A1* | 1/2009 | Khanna | G06Q 10/109 379/266.01 |
| 2015/0058344 | A1* | 2/2015 | Bhatia | G06F 16/285 707/737 |
| 2015/0169574 | A1* | 6/2015 | Bau | G06F 16/5866 707/E17.014 |
| 2015/0363451 | A1* | 12/2015 | Ince | G06F 16/2322 707/602 |
| 2018/0241881 | A1* | 8/2018 | Li | G06Q 10/10 |

(Continued)

OTHER PUBLICATIONS

Vaswani A., et al., "Attention Is All You Need", 2017, arXiv:1706.03762v5. 15 pages.

(Continued)

*Primary Examiner* — Quynh H Nguyen

(57) ABSTRACT

A device may include a processor configured to obtain a time series of documents; determine query scores for particular documents of the time series of documents based on a set of query terms; and determine time scores for the particular documents based on timestamps associated with the particular documents. The processor may be further configured to compute document relevancy scores for the particular documents based on a combination of the query scores and the time scores for the particular documents; order the particular documents based on the computed relevancy scores; and generate a document summary by applying a document summarizer applied to the ordered particular documents.

20 Claims, 12 Drawing Sheets

(56) References Cited

U.S. PATENT DOCUMENTS

| | | | | |
|---|---|---|---|---|
| 2021/0342377 | A1* | 11/2021 | Galle | G06F 40/58 |
| 2023/0214579 | A1* | 7/2023 | Somech | G06N 3/0455 |
| | | | | 715/271 |

OTHER PUBLICATIONS

Baumel, T., Eyal, M., Elhadad, "Query Focused Abstractive Summarization: Incorporating Query Relevance, Multi-Document Coverage, and Summary Length Constraints into Seq2Seq Models", 2018, arXiv:1801.07704. 9 pages.

Fabbri, A. R., et al., "Multi-News: A Large-Scale Multi-Document Summarization Dataset and Abstractive Hierarchical Model", 2019, arXiv:1906.01749. 11 pages.

Fan, A., et al., "Using Local Knowledge Graph Construction to Scale Seq2Seq Models to Multi-Document Inputs". 2019, arXiv:1910.08435. 16 pages.

Frermann, L., and Klementiev, A., "Inducing Document Structure for Aspect-Based Summarization". In Proc. of the 57th Annual Meeting of the Association for Computational Linguistics, 2019: p. 6263-6273. 11 pages.

Liu, P. J., et al., "Generating Wikipedia by Summarizing Long Sequences", 2018: arXiv:1801.10198. 18 pages.

Nallapati, R., et al., "Abstractive Text Summarization Using Sequence-to-Sequence RNNS and Beyond", 2016: arXiv:1602.06023. 12 pages.

Paulus, R., Xiong, C., and Socher, R., "A Deep Reinforced Model for Abstractive Summarization". 2017: arXiv:1705.04304. 12 pages.

Raffel, C., Shazeer, N., Roberts, A., Lee, K., Narang, S., Matena, M., and Liu, P. J. "Exploring the limits of transfer earning with a unified text-to-text transformer." 2019. arXiv preprint arXiv:1910.10683. 67 pages.

See, A., Liu, P. J., and Manning, C. D., "Get to the Point: Summarization with Pointer-Generator Networks", 2017: arXiv:1704.04368. 20 pages.

Sharma, E., Li, C., & Wang, L. "Bigpatent: A large-scale dataset for abstractive and coherent summarization," 2019: arXiv preprint arXiv:1906.03741. 10 pages.

Doshi K, Transformers Explained Visually (Part 3): Multi-head Attention, deep dive. A Gentle Guide to the inner workings of Self-Attention, Encoder-Decoder Attention, Attention Score and Masking, in Plain English. Towards Data Science. 2021. 31 pages.

Graff D, and Cieri C, "Linguistic Data Consortium: English Gigaword (LDC2003T05)", 2003. 2 pages.

Laskar, M. T. R., Hoque, E., and Huang, J., "Query Focused Abstractive Summarization Via Incorporating Query Relevance and Transfer Learning with Transformer Models". In Proc. Of the Canadian Conference on Artificial Intelligence, 2020: p. 342-348.

Lin, C. Y., "Rouge: A Package for Automatic Evaluation of Summaries". 2004, In Text Summarization Branches Out, p. 74-81.

Zhang, J., Tan, J., and Wan, X., "Adapting Neural Single-Document Summarization Model for Abstractive Multi Document Summarization: A Pilot Study." In Proc. of the 11th International Conference on Natural Language Generation, 2018: p. 381-390.

Rush M. A., Shopra S., and Weston J., "Abstractive Text Summarization Using Sequence-to-Sequence RNNS and Beyond", 2015: arXiv:1509.00686. 6 pages.

Wolf, T., et al., "Transformers: State-of-the-Art Natural Language Processing" In Proceedings of the 2020 Conference on Empirical Methods in Natural Language Processing: System Demonstrations, 2020: p. 38-45.

\* cited by examiner

1000 ⟶

| MODEL BASELINE 1010 | QUERY FILTERING 1020 | TQFS 1030 |
|---|---|---|
| A technician has been assigned to work this issue. the ticket is appended to an existing outage ticket which is currently being worked, and is being cross-referenced with the higher level outages master ticket 'the highest priority' this is regarding your circuit in ******. We apologize for any disruption you may be experiencing on your service. | Your incident ticket has been cross-referenced with the higher level outage master ticket and is currently working it the highest priority. A fiber contractor will be on site at the damaged fiber location at 10:00 AM PST - we will continue to supply updates periodically. Interval of updates may vary depending on the progress of the troubleshooting by the appropriate teams involved. Please standby, we appreciate your patience. this is regarding your ticket number ****** raised for site in *******. | The investigation is still ongoing in the master ticket, and we are pending further updates and estimated time of repair. a fiber was completely severed from the fire and the fiber will need to be replaced. The ticket has been escalated to the level 1. There is not an Estimated Time of Repair (ETR) available yet. The damage is located at *********** and crews are working now to get all the needed materials in place to begin the repairs. |

| MODEL BASELINE 1110 | QUERY FILTERING 1120 | TQFS 1130 |
|---|---|---|
| new update will be provided **** around 11.30 pm gmt. a tech will review and update the next plan of action ASAP. Thank you for your online comment and apologize for the inconveniences that this issue may be causing to you. | affected site: **** primary circuit ****. initial testing has been performed based on the reported incident - and test results indicate an issue with the local access providers network. Upon checking ticket is queued for next available repair tech to get picked up to review, we have sent an escalation mail to our repair team to expedite the process. | customer opened a case reporting that the site was down on 2021-12-17 19:21 GMT. The customer was able to detect the ARP entry of the user's equipment – extended ping to CE clean, no drops/ delay Next plan of action customer to verify service. For any additional requests or questions, please utilize ***** using the first three characters listed on this ticket as your PIN. |

FIG. 11

SYSTEMS AND METHODS FOR TIME-SERIES QUERY FOCUSED DOCUMENT SUMMARIZATION FROM MULTIPLE DOCUMENTS

BACKGROUND INFORMATION

To satisfy the needs and demands of users of mobile communication devices, providers of wireless communication services continue to improve and expand available services as well as networks used to deliver such services. One aspect of such improvements includes the development of radio access networks as well as options to utilize such radio access networks. Customers of a provider of wireless communication services may make various customer service requests. A customer service request may accumulate a large amount of data as it is being processed. Managing the large amount of data associated with a customer service request may pose various challenges.

BRIEF DESCRIPTION OF THE DRAWINGS

FIG. 10 is a first diagram illustrating exemplary document summaries generated using an abstract summarizer according to an implementation described herein; and FIG. 11 is a second diagram illustrating exemplary document summaries generated using a document summarizer according to an implementation described herein.

DETAILED DESCRIPTION OF EMBODIMENTS

Figure 1:
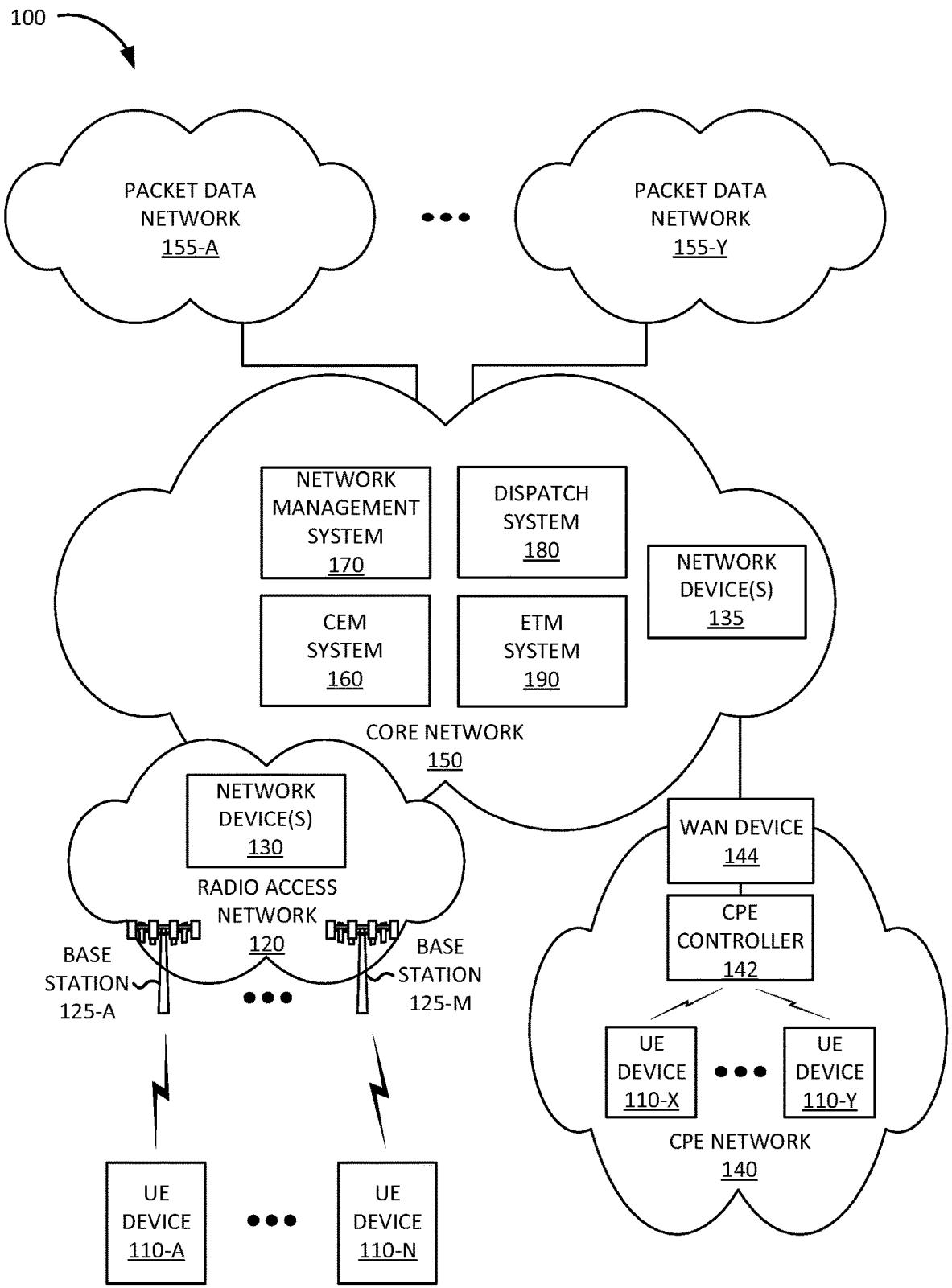
FIG. 1 illustrates an environment according to an implementation described herein.

The following detailed description refers to the accompanying drawings. The same reference numbers in different drawings identify the same or similar elements.

A provider of communication services, such as wired, optical, and/or wireless communication services, may generate a service ticket for a customer when the customer reports a service outage or another type of problem with a service, requests installation of new equipment or activation of a new service, calls customer support with a complaint or an inquiry about an account or billing issue, and/or makes another type of request by contacting a customer service center associated with the provider. A ticket document may be generated to describe the service ticket and additional ticket documents may be generated in response to activities associated with the service ticket. The ticket documents associated with the service ticket may track the progress of the service ticket.

A service ticket may accumulate a large number of ticket documents, generated by different subsystems, which include historical information as well as recent updates relating to the service ticket. A customer, a customer service representative, a technician working on the service ticket, and/or another type of person associated with the service ticket, may inquire about the status of the service ticket. Analyzing or reading through a large number of ticket documents to determine a status of a service ticket may be time consuming, may result in an inefficient use of resources, and may be difficult to resolve in a timely manner.

A text summarizer, such as a neural network text summarizer, may be used to generate a summary of the ticket documents. However, a large discrepancy may exist between a summary generated by a text summarizer and a summary produced by a human. The computer-generated summary may be difficult to read and may fail to account for what is important to a customer inquiring about the service ticket status. A computer-generated summary may be improved by a Query Focused Summarization (QFS) model. In a QFS model, a query set is generated based on common words and phrases extracted from summaries generated by human agents. The query set may then be used to rank the documents based on similarity to the query set and the ranked documents may be then be passed into the text summarizer. The QFS model may produce more readable summaries that maintain context. However, the summaries generated by a QFS model may include outdated information and/or information that is no longer valid, because ticket documents are produced in chronological order and more recent documents may contradict information included in older documents. Thus, a QFS model may not perform well in summarizing a time-series of documents.

Implementations described herein relate to systems and methods for a time-series query focused abstractive summarization (TQFS) from multiple documents. A device implementing a TQFS model may compute a document relevancy score for particular documents in a time-series set of documents, rank the documents based on the computed document relevancy scores, and provide the ranked documents as input into a document summarizer model to generate a summary document. The document relevancy score for a document in the time-series set may be based on a combination of a query score that measures a similarity of the document to a query set and a time score based on a timestamp associated with the document. Ranking documents based on a combination of the query score and the time score may result in a more accurate summary, because more recent documents with relevant query terms are given more weight by the document summarizer model.

For example, the device implementing the TQFS model may be configured to obtain a time series of a set of documents; determine query scores for particular documents of the set of documents based on a set of query terms; determine time scores for the particular documents based on timestamps associated with the particular documents; and compute document relevancy scores for the particular documents based on a combination of the query scores and the time scores for the particular documents. The device may be further configured to order the particular documents based on the computed relevancy scores and generate a document summary for the set of documents by applying a document summarizer to the ordered particular documents. The documents may include, for example, ticket documents generated in connection with processing a customer service ticket associated with a provider of communication services.

Determining the query scores may include choosing a set of query terms, appending the set of query terms to the set of documents, determining the term frequency-inverse frequency (TF-IDF) values for the appended set, and computing a query score for a document based on a cosine similarity between the query terms and the document. TF-IDF is a statistical value that reflects the importance of a word to a document in a corpus of documents and is computed as a product of a frequency of a term in a document (i.e., TF), and a measure of how much information the word provides (i.e., IDF). IDF is computed by dividing the total number of documents in the corpus by the number of documents that include the word and taking a logarithm of the result. Determining the time scores may include converting the document timestamps to metric values on a metric scale, normalizing the metric values based on a minimum timestamp value and a maximum timestamp value in the set of documents, and applying a decay function to the normalized metric values to determine the time scores. Computing the document relevancy scores may include computing a product of the query score for a document and the time score for the document. Generating the document summary for the set of documents using the document summarizer may include truncating the ordered particular documents to a particular number of ordered documents.

In some implementations, the document summarizer may include a transformer neural network model. The transformer neural network model may be trained using a corpus of documents generated in connection with processing a customer service ticket associated with a provider of communication services. Furthermore, the document summarizer may include multiple transformer neural network models, each trained on a different corpus of ticket documents. For example, different types of tickets may be summarized using different query sets and/or different transformer neural network models. In other implementations, a different type of document summarizer may be used, such as a set of multi-layer perceptron neural networks and/or other types of neural networks. The document summarizer may include an abstractive summarizer. An "abstractive" summarizer may generate a summary that includes phrases and/or sentences not necessarily included in the documents being summarized. For example, a set of phrases and/or sentences may be abstracted into a phrase and/or sentence that forms an abstract of the set of phrases and/or sentences.

While implementations and examples described herein refer to a time series of ticket documents generated in connection with processing a customer service ticket associated with a provider of communication services, in other implementations, different types of time series of documents from different use domains may be summarized. As an example, a time series of documents may include news documents describing a news event. The news documents may include documents published by newspapers and/or news agencies for public consumption, news documents generated by an enterprise for private consumption by customers or employees associated with the enterprise, and/or other types of news documents. As another example, a time series of documents may include health care documents associated with a health condition of a patient or a group of patients. The health documents may be subject to privacy laws and accessibility of a generated document summary may be restricted to health professionals, patients, or other entities authorized to access health information associated with the patient. As yet another example, a time series of documents may include legal documents associated with a legal case. As yet another example, a time series of documents may include documents associated with a construction project. Thus, any time series of documents related to the progress of an event associated with a temporal component may be summarized using the systems and methods described herein.

FIG. 1 is a diagram of an exemplary environment 100 in which the systems and/or methods described herein may be implemented. As shown in FIG. 1, environment 100 may include UE devices 110-A to 110-N and 110-X to 110-Y (referred to herein collectively as "UE devices 110" and individually as "UE device 110"), base stations 125-A to 125-M (referred to herein collectively as "base stations 125" and individually as "base station 125") in Radio Access Network (RAN) 120, a Customer Premises Equipment (CPE) network 140, a core network 150, and packet data networks (PDNs) 155-A to 155-Y (referred to herein collectively as "PDNs 155" and individually as "PDN 155").

UE device 110 may include any device with cellular and/or WiFi wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV™, Google Chromecast™, Amazon Fire TV™, etc.), a WiFi access point (AP), a smart television, a fixed wireless access device, etc.; a portable gaming system; a global positioning system (GPS) device; a home appliance device; a home monitoring device; and/or any other type of computer device with wireless communication capabilities and a user interface. In some implementations, UE device 110 may communicate using machine-to-machine (M2M) communication, such as Machine Type Communication (MTC), and/or another type of M2M communication for IoT applications.

RAN 120 may include base stations 125. Base station 125 may enable UE device 110 to communicate with core network 150. Base station 125 may be configured for one or more Radio Access Technology (RAT) types. For example, base station 125 may include a Fifth Generation (5G) New Radio (NR) base station (e.g., a gNodeB) and/or a Fourth Generation (4G) Long Term Evolution (LTE) base station (e.g., an eNodeB). Each base station 125 may include devices and/or components to enable cellular wireless communication with UE devices 110. For example, base station 125 may cover a set of base station cells, also referred to as base station sectors. That is, each cell may cover a sector (e.g., a 120° sector, etc.). Base station 125 may include a radio frequency (RF) transceiver configured to send and receive wireless signals in the direction of the sector and be configured to communicate with UE devices 110 using a 5G NR air interface, a 4G LTE air interface, and/or using another type of cellular air interface. Furthermore, base station 125 may include one or more edge computing devices configured to perform cloud computing for UE devices 110 serviced by base station 125.

RAN 120 may include one or more network devices 130 (referred to herein collectively as "network devices 130" and individually as "network devices 130"). Network device 130 may include a transport network device that provides connectivity from base station 125 to core network 150. Network device 130 may include, for example, a switch, router, firewall, gateway, an optical switching device (e.g., a reconfigurable optical add-drop multiplexer, etc.), and/or another type of network device.

CPE network 140 may include a local area network (LAN) associated with a customer's premises. CPE network 140 may be located at or within a residential home, in an apartment building, in a school, in a commercial office building, in a shopping mall, in a connected mass transit vehicle (e.g., bus, train, plane, boat, etc.), and/or in another type of location associated with a customer of a provider of telecommunication services. CPE network 140 may include UE devices 110-X to 110-Y, a CPE controller 142, and a wide area network (WAN) device 144. CPE network 140 may be managed, at least in part, by a provider of communication services, such as a provider managing RAN 120 and/or provider network 150. For example, the provider may enable CPE network 140 to connect to provider network 150 via a managed network device, such as WAN device 144 and/or CPE controller 142. CPE network 140 may receive one or more services via a wireless connection between a WAN device 144 and provider network 150, such as, for example, a television service, Internet service, and/or voice communication (e.g., telephone) service. For example, CPE network 140 may be implemented as a gigabit network that enables gigabit speed connections.

WAN device 144 may interface CPE network 140 to a WAN, such as provider network 150, via a wired and/or wireless connection. As an example, WAN device 144 may include an optical network terminal (ONT). An ONT may connect to provider network 150 via an optical fiber and may function as a gateway device to Gigabit Passive Optical Network (GPON) or a GPON2 located in provider network 150. As another example, WAN device 144 may connect to provider network 150 via a wired electrical connection, such as a coaxial cable. As yet another example, WAN device 144 may include a fixed wireless access (FWA) device configured to communicate with provider network 150 via a RAN 120.

CPE controller 142 may include a network device, such as a switch, router, firewall, and/or gateway and may support different types of interfaces, such as an Ethernet interface, a WiFi interface, a Multimedia over Coaxial Alliance (MoCa) interface, and/or other types of interfaces. CPE controller 142 may additionally function as a WiFi AP. CPE controller 142 may include a transceiver configured to communicate with UE devices 110 using WiFi signals based on the Institute of Electrical and Electronics Engineers (IEEE) 802.11 standards for implementing a wireless LAN network. UE devices 110-X to 110-Y may communicate with CPE controller 142 using WiFi signals.

Core network 150 may be managed by a provider of cellular wireless communication services and may manage communication sessions of subscribers (e.g., UE devices 110) connecting to core network 150 via RAN 120 and/or CPE network 140. For example, core network 150 may establish an Internet Protocol (IP) connection between UE devices 110 and PDN 155. In some implementations, core network 150 may include a 5G core network. In other implementations, core network 150 may include a 4G core network (e.g., an evolved packet core (EPC) network).

The components of core network 150 may be implemented as dedicated hardware components or as virtualized functions implemented on top of a common shared physical infrastructure using Software Defined Networking (SDN). For example, an SDN controller may implement one or more of the components of core network 150 using an adapter implementing a Virtual Network Function (VNF) virtual machine, a CNF container, an event driven serverless architecture interface, and/or another type of SDN component. The common shared physical infrastructure may be implemented using one or more devices 200 described below with reference to FIG. 2 in a cloud computing center associated with core network 150. Core network 150 may include network devices 135, a Customer Experience Management (CEM) system 160, a network management system 170, a dispatch system 180, and an Electronic Ticket Management (ETM) system 190.

Network device 135 may provide connectivity within core network 150. Network device 135 may include, for example, a switch, router, firewall, gateway, an optical switching device (e.g., a reconfigurable optical add-drop multiplexer, etc.), and/or another type of network device.

CEM system 160 may include one or more computer devices, such as server devices and/or cloud computing devices, configured to manage customer experience for customers serviced by a provider associated with RAN 120, CPE network 140, and/or core network 150. For example, CEM system 160 may include an interactive voice response (IVR) system that answers a call from UE device 110, plays an initial greeting, and prompts the customer using UE device 110, via played audio messages, to provide information to the IVR system. Additionally, or alternatively, CEM system 160 may receive instant messages (IMs), short message service (SMS) format messages, emails, messages received via a CEM application installed on UE device 110, and/or other types of messages from customers. CEM system 160 may then route the call and/or messages to a customer service agent to assist the customer with the customer's concerns. Additionally, CEM system 160 may interface with an ordering system, a billing system, and/or an account management system (not shown in FIG. 1) to obtain ordering, billing, and/or accounting information associated with a customer. CEM system 160 may automatically, or via an action taken by a customer service agent, instruct ETM system 190 to open a new service ticket and/or forward a status inquiry relating to an existing service ticket from a customer to ETM system 190. Additionally, CEM system 160 may generate a ticket document for an existing service ticket and provide the generated ticket document to ETM system 190.

Network management system 170 may include one or more computer devices, such as server devices and/or cloud computing devices, configured to manage particular operations of RAN 120, CPE network 140, and/or core network 150. For example, network management system 170 may monitor RAN 120, CPE network 140, and/or core network 150 for the status of particular devices and/or links between devices by receiving heartbeat messages, status reports, and/or error messages and/or by querying devices in RAN 120, CPE network 140, and/or core network 150 at particular intervals. Network management system 170 may generate ticket documents based on the obtained status information and provide the generated ticket documents to ETM system 190.

Dispatch system 180 may include one or more computer devices, such as server devices, configured to dispatch a technician to a location to perform a diagnostic assessment and/or a repair on device, or a link between devices, in RAN 120, CPE network 140, and/or core network 150. Dispatch system 180 may generate ticket documents based on activities of dispatched technicians and provide the generated ticket documents to ETM system 190.

ETM system 190 may include one or more computer devices, such as server devices, configured to manage service tickets associated with RAN 120, CPE network 140, and/or core network 150. For example, ETM system 190 may store information relating to service tickets, such as ticket documents generated for service tickets by CEM system 160, network management system 170, dispatch system 180, and/or other systems or devices associated with RAN 120, CPE network 140, and/or core network 150. Furthermore, ETM system 190 may include a document summarizer configured to generate a document summary for a service ticket based on ticket documents associated with the service ticket.

PDNs 155-A to 155-Y may each include a PDN connected to core network 150. A particular PDN 155 may be associated with a Data Network Name (DNN) in 5G, and/or an Access Point Name (APN) in 4G, and UE device 110 may request a connection to PDN 155 using the DNN or APN. PDN 155 may include, and/or be connected to and enable communication with, a local area network (LAN), a wide area network (WAN), a metropolitan area network (MAN), an autonomous system (AS) on the Internet, an optical network, a cable television network, a satellite network, another wireless network (e.g., a Code-Division Multiple Access (CDMA) network, a general packet radio service (GPRS) network, etc.), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
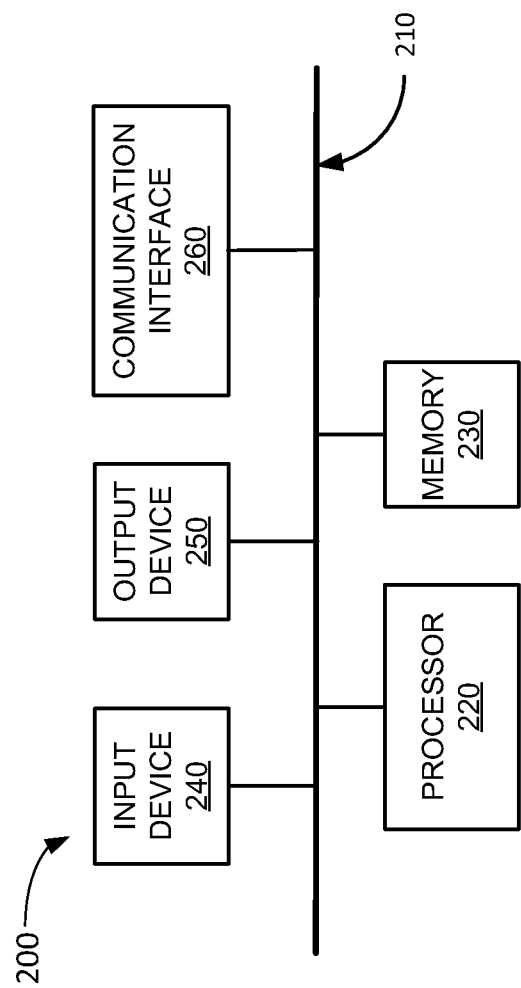
FIG. 2 is a diagram illustrating exemplary components of a device that may be included in a component of an environment according to an implementation described herein.

FIG. 2 illustrates example components of a device 200 according to an implementation described herein. UE device 110, base station 125, network device 130, CPE controller 142, WAN device 144, CEM system 160, network management system 170, dispatch system 180, and/or ETM system 190, may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to responding to status inquiries for service tickets and generating summary documents for the service tickets. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
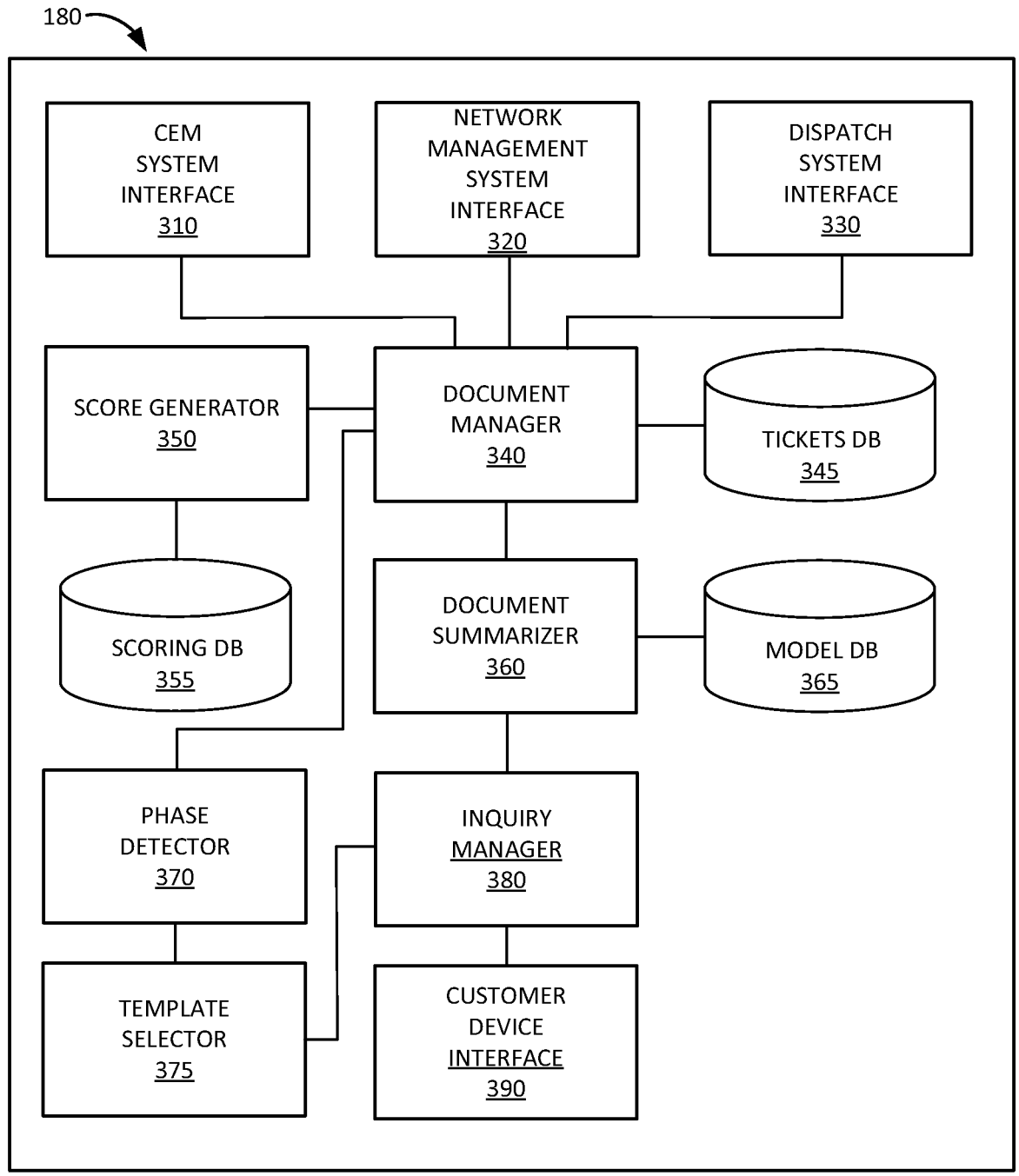
FIG. 3 is a diagram illustrating exemplary components of an electronic ticket management (ETM) system according to an implementation described herein.

FIG. 3 is a diagram illustrating exemplary components of ETM system 190. The components of ETM system 190 may be implemented, for example, via processor 220 executing instructions from memory 230. Alternatively, some or all of the components of ETM system 190 may be implemented via hard-wired circuitry. As shown in FIG. 3, ETM system 190 may include a CEM system interface 310, a network management system interface 320, a dispatch system interface 330, a document manager 340, a ticket database (DB) 345, a score generator 350, a scoring DB 355, a document summarizer 360, a model DB 365, a phase detector 370, a template selector 375, an inquiry manager 380, and a customer device interface 390.

CEM system interface 310 may be configured to communicate with CEM system 160. For example, CEM system interface 310 may receive, from CEM system 160, a request to create a service ticket, a status inquiry for an existing service ticket, a new ticket document for an existing service ticket, etc. Network management system interface 320 may be configured to communicate with network management system 170. For example, network management system interface 320 may receive a new ticket document for a service ticket from network management system 170. Dispatch system interface 330 may be configured to communicate with dispatch system 180. For example, dispatch system interface 330 may receive a new ticket document for a service ticket from dispatch system 180.

Document manager 340 may manage ticket documents associated with service tickets. For example, document manager 340 may receive and store ticket document associated with service tickets in tickets DB 345. Ticket DB 345 may store information relating to service tickets managed by ETM system 190. For example, for each service ticket, ticket DB 345 may store information identifying the service ticket, a customer associated with the service ticket, an account associated with the service ticket, one or more devices associated with the service ticket, a ticket type for the service ticket, and/or other types of identifying information associated with the service ticket. Furthermore, ticket DB 345 may store ticket documents associated with the service ticket.

Document manager 340 may filter the ticket documents associated with a service ticket to remove ticket documents that are determined to lack relevance in generating a document summary. For example, document manager 340 may use a trained binary classification model to determine whether to remove a ticket document from the input set for generating a document summary for the service ticket. Alternatively, or additionally, document manager 340 may use a set of regular expressions and an indication for each regular expression as to whether a document matching the regular expression should be either removed or included in the input set of ticket documents for generating the document summary.

Document manager 340 may further determine document relevancy scores for ticket documents associated with a service ticket by using score generator 350. Score generator 350 may determine document relevancy scores for ticket documents associated with a service ticket using information stored in scoring DB 355. Scoring DB 355 may store information used to generate document relevancy scores for ticket documents. Exemplary information that may be stored in scoring DB 355 is described below with reference to FIG. 4.

Score generator 350 may select a query set for ticket documents associated with a service ticket and determine query scores for particular ticket documents based on a similarity to the query set. For example, score generator 350 may append the query set to a list of ticket documents associated with a service ticket, generate a TF-IDF matrix of values for each query term in each document in the set of ticket documents, and compute the query scores for the documents as cosine similarity values (e.g., the dot product of the vectors divided by the product of the lengths of the vectors) between the TF-IDF vector for each document and the TF-IDF vector of the query set.

Score generator 350 may further select a decay function and determine time scores for ticket documents based on timestamps associated with the ticket documents. For example, score generator 350 may convert the timestamps to single numeric Unix timestamps (e.g., the number of seconds since Jan. 1, 1970 in Coordinated Universal Time (UTC)), determine maximum and minimum timestamps in the set of ticket documents, and normalize the timestamps using a scale between 0 and 1, where 1 is the most recent timestamp (i.e., the maximum timestamp) and 0 is the oldest timestamp (i.e., the minimum timestamp).

The selected decay function may then be applied to the normalized values. The decay function may determine the importance of the time dimension in determining the document relevancy scores for the ticket documents. For example, a gradual decay function may generate final timestamp values that are close to 1, resulting in a small differentiation between the importance of recent ticket document and older ticket documents. In contrast, a quickly decaying decay function may result in a higher importance being placed on more recent documents. For example, each normalized time score value may be raised to an exponent e. For e>1, the timestamps will shrink in value, resulting in a higher importance for recent documents), while for e<0, the timestamps will increase in value (resulting in a lower importance for recent documents). Different types of ticket documents may be associated with different decay functions. For example, more time sensitive ticket types may be assigned a quicker decaying decay function and less time sensitive ticket types may be assigned a slower decaying decay function.

Score generator 350 may further select a score function and compute document relevancy scores for the ticket documents based on the query scores, the time scores, and the selected score function. For example, score generator 350 may generate a document relevancy score for each document in the set of ticket documents as a product of the query score for the document and a time score for the document. As another example, score generator 350 may combine the query scores and time scores for a document using a different function, such as by multiplying the query score or the time score by a factor to increase or decrease the relative importance of the query score or the time score with respect to each other. Different types of tickets may be associated with different score functions.

Document summarizer 360 may generate a document summary for a service ticket based on the ticket documents associated with the service tickets. For example, document summarizer 360 may rank and order ticket documents associated with a service ticket based on document relevancy scores computed for the ticket documents by score generator 350, select a summarizer model from model DB 365 based on a ticket type associated with the service ticket, and provide the ordered ticket documents as input into the selected summarizer model to generate a document summary.

Model DB 365 may store one or more document summarizer models trained to generate a document summary based on multiple documents. For example, each document summarizer model may store a neural network model, or an address for accessing an Application Programming Interface (API) associated with a neural network model, trained to generate a document summary based on an input of a set of documents. The neural network model may correspond to a transformer neural network or to another type of neural network. Different summarizer models may be trained using different corpora of documents. For example, a first summarizer model for a first type of service ticket may be trained using ticket documents associated with the first type of service ticket, a second summarizer model for a second type of service ticket may be trained using ticket documents associated with the second type of service ticket, etc.

Phase detector 370 may determine a current phase associated with a service ticket and predict a likely next phase for the service ticket. For example, phase detector 370 may include a machine learning model trained on a corpus of service tickets in different phases of resolution. The machine learning model may include, for example, a Hidden Markov Model (HMM), a Recurrent Neural Network (RNN) model, Long Short-Term Memory (LSTM) neural network model, a Seq2seq attention model, and/or another type of machine learning model. Phase detector 370 may generate a lifecycle model graph of service tickets that includes a set of nodes representing phases, such as, for example, a "ticket created" phase, an "automated work" phase, a "testing in progress" phase, a "work in progress" phase, a "third party work" phase, a "resolved" phase, an "on hold" phase, and/or a "ticket closed" phase, and a set of paths between the nodes along with weights representing a probability or likelihood of a ticket progressing from one phase to another phase. The trained model may use as input the documents associated with a ticket and may label each document, or a group of documents, as being associated with a particular phase. The model may then determine a current phase of the ticket and a predicted next phase for the ticket based on the weights of the paths between the nodes representing the phases.

Template selector 375 may select a template for a document summary from a set of templates based on the determined current phase and the predicted next phase of the service ticket. Each template may include text relevant to a current phase of a service ticket and/or a predicted next phase of the service ticket, along with one or more fields to be filled with a summary generated by document summarizer 360.

Inquiry manager 380 may manage inquiries relating to service tickets. For example, inquiry manager may receive a status request for a service ticket and provide a request to document summarizer 360 to generate a document summary for the service ticket. Customer device interface 390 may be configured to interface with a customer device, such as UE device 110, an application server in PDN 155, and/or another type of customer device. Customer device interface 390 may receive a status inquiry for a service ticket from the customer device, provide the status inquiry to inquiry manager 380, receive a document summary for the service ticket from inquiry manager 70, and forward the document summary to the customer device.

Although FIG. 3 shows exemplary components of ETM system 190, in other implementations, ETM system 190 may include fewer components, different components, additional components, or differently arranged components than depicted in FIG. 3. Additionally, or alternatively, one or more components of ETM system 190 may perform one or more tasks described as being performed by one or more other components of ETM system 190.

Figure 4:
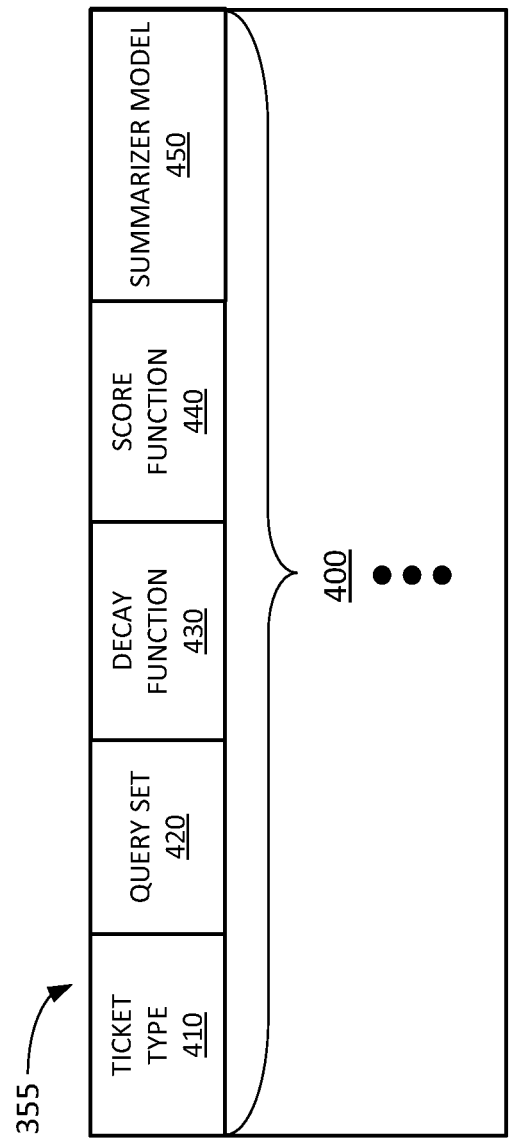
FIG. 4 is a diagram illustrating exemplary components of the scoring database (DB) according to an implementation described herein.

FIG. 4 is a diagram illustrating exemplary components of scoring DB 355. As shown in FIG. 4, scoring DB 355 may include one or more ticket type records 400. Each ticket type record 400 may store information relating to a particular ticket type. Ticket type record 400 may include a ticket type field 410, a query set field 420, a decay function field 430, a score function field 440, and a summarizer model field 450.

Ticket type field 410 may store information identifying a service ticket type. A service ticket type may include, for example, an outage ticket, a service quality ticket, a new service order ticket, a service cancelation ticket, a billing ticket, an accounting ticket, a ticket associated with a particular technology type (e.g., 4G wireless technology ticket, a 5G wireless technology ticket, a WiFi technology ticket, a fiberoptic technology ticket, a coaxial connection technology ticket, a cloud center technology ticket, a Multi-Access Edge Computing (MEC) ticket, etc.), a digital content technology ticket, a ticket associated with a particular Quality of Service (QoS) class, a ticket associated with a particular network slice, a ticket associated with a particular network infrastructure (e.g., an enhanced Mobile Broadband (eMBB) network infrastructure, a massive Internet of Things (IoT) network infrastructure, an Ultra-Reliable Low Latency Communication (URLLC) network infrastructure, etc.), a ticket associated with a particular geographic area, and/or another type of service ticket type.

Query set field 420 may store a query set associated with the service ticket type. The query set may include a set of terms and phrases extracted from human-generated document summaries for service tickets identified as belonging to the service ticket type. Decay function field 430 may store information identifying a decay function, associated with the service ticket type, to decay time values associated with ticket documents. For example, for more time sensitive service ticket types, decay function field 430 may identify a faster decaying decay function and for less time sensitive service ticket types, decay function field 430 may identify a slower decaying decay function.

Score function field 440 may store information identifying a score function that uses a query score and a time score as an input and outputs a document relevancy score. For example, the score function may generate a product of the query score and the time score. As another example, the score function may add an offset value to the query score or to the time score before multiplying the query score and the time score together. Summarizer model field 450 may identify and/or point to a summarizer model associated with the service ticket type. For example, the summarizer model may be trained on a corpus of ticket documents for service tickets belonging to the service ticket type.

Although FIG. 4 shows exemplary components of scoring DB 355, in other implementations, scoring DB 355 may include fewer components, different components, additional components, or differently arranged components than depicted in FIG. 4.

Figure 5:
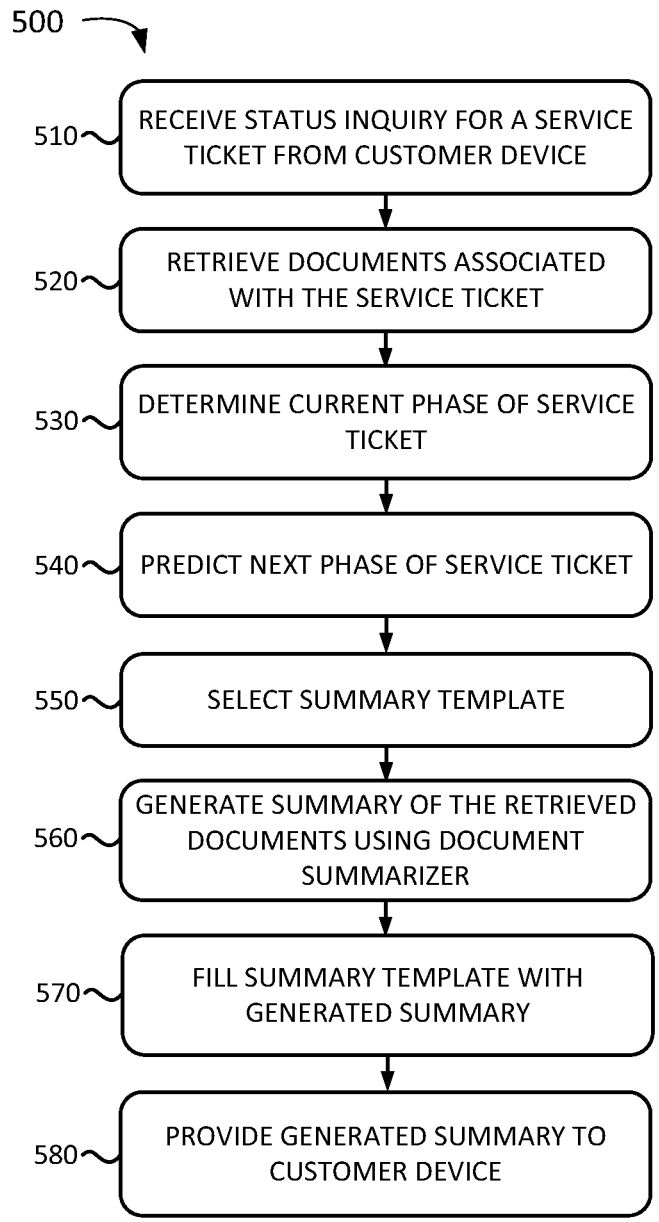
FIG. 5 illustrates a flowchart for processing a status inquiry for a service ticket according to an implementation described herein.

FIG. 5 illustrates a flowchart 500 for processing a status inquiry for a service ticket according to an implementation described herein. In some implementations, process 500 of FIG. 5 may be performed by ETM system 190. In other implementations, some or all of process 500 may be performed by another device or a group of devices.

As shown in FIG. 5, process 500 may include receiving a status inquiry for a service ticket from a customer device (block 510). For example, a customer may contact CEM system 160 to inquire about the status of a service ticket, be connected to a customer service agent, and the customer service agent may request a ticket summary for the service ticket by sending a request to ETM system 190. As another example, a customer may use a customer device, such as UE device 110, to directly contact ETM system 190 to request a ticket summary for a service ticket. For example, UE device 110 may include an application to manage the customer's account and/or subscription with the provider of communication services, and the application may include an option to send a status inquiry for any service tickets associated with the account or subscription.

Process 500 may further include retrieving documents associated with the service ticket (block 520), determining a current phase the service ticket (block 530), predicting a next phase of the service ticket (block 540), and selecting a summary template (block 550). For example, ETM system 190 may receive ticket documents associated with a service ticket from CEM system 160, network management system 170, dispatch system 180, and/or other systems or devices, such as a billing system, an accounting system, a provisioning system, an ordering system, a Self-Organizing Network (SON) system, etc., and store the received ticket documents in tickets DB 345. ETM system 190 may then determine the current phase of the service ticket and the predicted next phase of the service ticket using a trained machine learning model. The current phase and predicted next phase may be used to select a document template, from a set of document templates, for providing a summary to the user.

Process 500 may further include generating a summary of the retrieved documents (block 560). For example, ETM system 190 may filter the retrieved ticket document to eliminate documents with low relevance to generating a summary (e.g., by determining whether each document matches a regular expression in a set of regular expressions, etc.). ETM system 190 may use the filtered set of ticket documents as input into a document summarizer to generate a summary document for the service ticket as described below with reference to FIG. 6. Process 500 may further include filling the selected summary template with the generated summary (block 570) and providing the generated summary to the customer device (block 580). For example, ETM system 190 may fill the selected document template with the generated document summary, perform language mapping to clean up the language, and send the generated summary document for the service ticket to the requesting device. The language mapping process may map a set of phrases and/or sentences in the generated summary to a set of customer-facing terms and/or phrases to, for example, expand abbreviations, remove technical jargon and/or references to internal terms or procedures that may be difficult for a customer to understand, etc. The language mapping process may be performed using a language mapping dictionary generated by a domain expert associated with a particular service ticket type.

Figure 6:
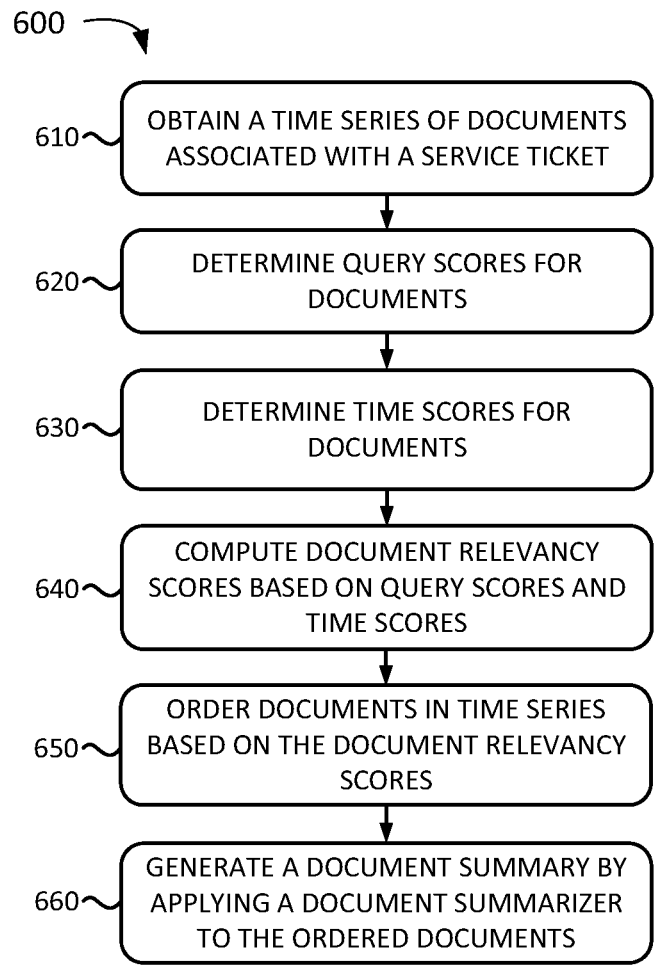
FIG. 6 illustrates a flowchart for generating a document summary for a time series of documents according to an implementation described herein.

FIG. 6 illustrates a flowchart 600 for generating a document summary for a time series of documents according to an implementation described herein. In some implementations, process 600 of FIG. 6 may be performed by ETM system 190. In other implementations, some or all of process 600 may be performed by another device or a group of devices.

As shown in FIG. 6, process 600 may include obtaining a time series of documents associated with a service ticket (block 610). For example, document manager 340 may receive any new ticket documents associated with a service ticket from CEM system 160, network management system 170, dispatch system 180, and/or other systems or devices, such as a billing system, an accounting system, a provisioning system, an ordering system, a Self-Organizing Network (SON) system, etc., and store the received ticket documents in tickets DB 345. Each ticket document may be associated with a timestamp. When a status inquiry for the service ticket is received, document manager 340 may determine document relevancy scores for all the ticket documents that have been received for the service ticket up to the time at which the status inquiry was received.

Process 600 may further include determining query scores for documents (block 620). For example, score generator 350 may determine a ticket type for the service ticket, select a query set from scoring DB 355 based on the determined ticket type, and compute query scores for the ticket documents associated with the service ticket based on the query set. Score generator 350 may append the query set to a list of the ticket documents, generate a TF-IDF matrix of values for each query term in each document in the list of ticket documents, and compute cosine similarity values between the TF-IDF vector for each document and the TF-IDF vector of the query set. In other implementations, a different similarity measure may be used.

Process 600 may further include determining time scores for documents (block 630). For example, score generator 350 may determine a ticket type for the service ticket, select a decay function based on the determined ticket type, and determine time scores for ticket documents based on timestamps associated with the ticket documents and the selected decay function. Score generator 350 may convert the timestamps associated with the ticket documents to metric scale timestamps, determine the maximum and minimum timestamps in the set of ticket documents, and normalize the metric scale timestamps between a scale of 0 and 1, with 1 corresponding to the maximum timestamp and 0 corresponding to the minimum timestamp, and apply the selected decay function to the normalized timestamp values to generate time scores for the ticket documents.

Process 600 may further include computing document relevancy scores based on the query scores and time scores (block 640). For example, score generator 350 may select a score function from scoring DB 355 based on the ticket type and compute document relevancy scores for the ticket documents based on the query scores, the time scores, and the selected score function. For example, score generator 350 may generate a document relevancy score for each document in the set of ticket documents as a product of the query score for the document and a time score for the document.

Process 600 may further include ordering the documents in the time series based on the document relevancy scores (block 650) and generating a document summary by applying a document summarizer to the ordered documents (block 660). For example, document summarizer 360 may rank and order the ticket documents in order of descending document relevancy scores (i.e., the ticket document with the highest document relevancy score being listed first) and then provide the ordered ticket documents as an input to a document summarizer. Document summarizer 360 may select a document summarizer model from model 365 based on the ticket type associated with the service ticket. For example, different ticket types may be associated with different document summarizer models trained using documents associated with different ticket types. The document summarizer may include, for example, a Text-To-Text Transfer Transformer neural network model. In some implementations, document summarizer 360 may truncate the list of ordered ticket documents to a particular number of ticket documents (e.g., the first 512 ticket documents, etc.) in order to remove low relevance document and/or to meet input limitations associated with a document summarizer model. Document summarizer 360 may select other parameters for the document summarizer, such as, for example, a minimum and maximum length for the document summary to be generated. Document summarizer 360 may output the document summary generated by the document summarizer model to be provided as a response to a status inquiry for a service ticket.

Figure 7A:
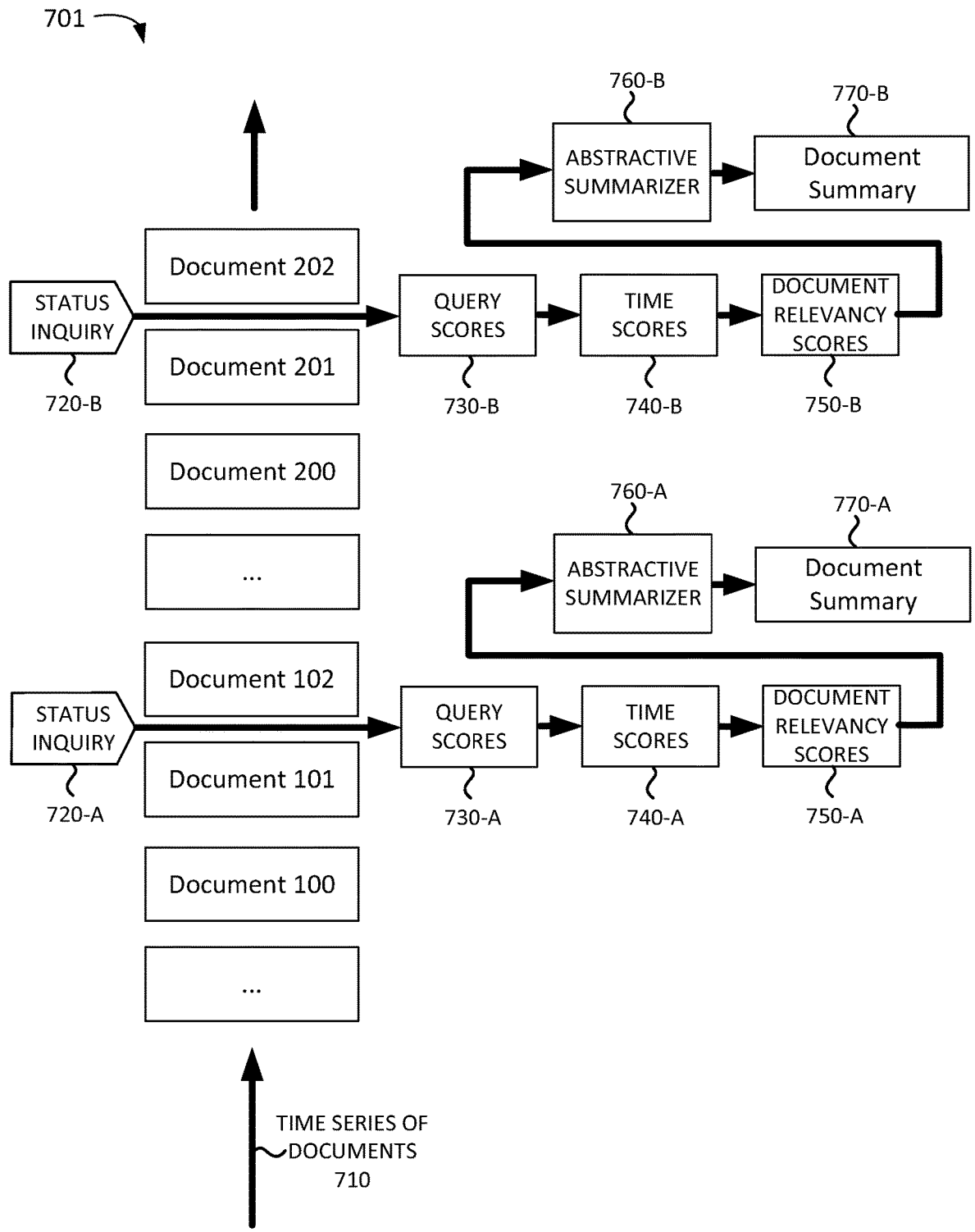
FIGS. 7A and 7B are diagrams illustrating an exemplary set of status inquiries and summary document generation according to an implementation described herein.

FIG. 7A is a diagram illustrating an exemplary series of status inquiries 700 according to an implementation described herein. As shown in FIG. 7A, status inquiries 700 may include a time series of documents 710 for a service ticket. When a first status inquiry 720-A is received by document summarizer 360, document summarizer 360 may generate query scores 730-A for the documents in time series of documents 710 up to the time when first status inquiry 720-A was received, namely documents 001 to 101. Document summarizer 360 may then generate time scores 740-A for documents 001 to 101 and compute document relevancy scores 750-A for the documents by computing a product of a query score and time score for each document. The documents may then be ranked and sorted based on the computed document relevancy scores 750-A and provided as input into document summarizer model 760-A to generate a document summary 770-A.

At a later time, a second status inquiry 720-B may be received by document summarizer 360, after documents 102 to 201 were added to time series of documents 710. Document summarizer 360 may generate query scores 730-B for the documents in time series of documents 710 up to the time when first status inquiry 720-B was received, namely documents 001 to 201. Document summarizer 360 may then generate time scores 740-B for documents 001 to 201 and compute document relevancy scores 750-B for the documents by computing a product of a query score and time score for each document. The documents may then be ranked and sorted based on the computed document relevancy scores 750-B and provided as input into document summarizer model 760-B to generate a document summary 770-B.

Figure 7B:
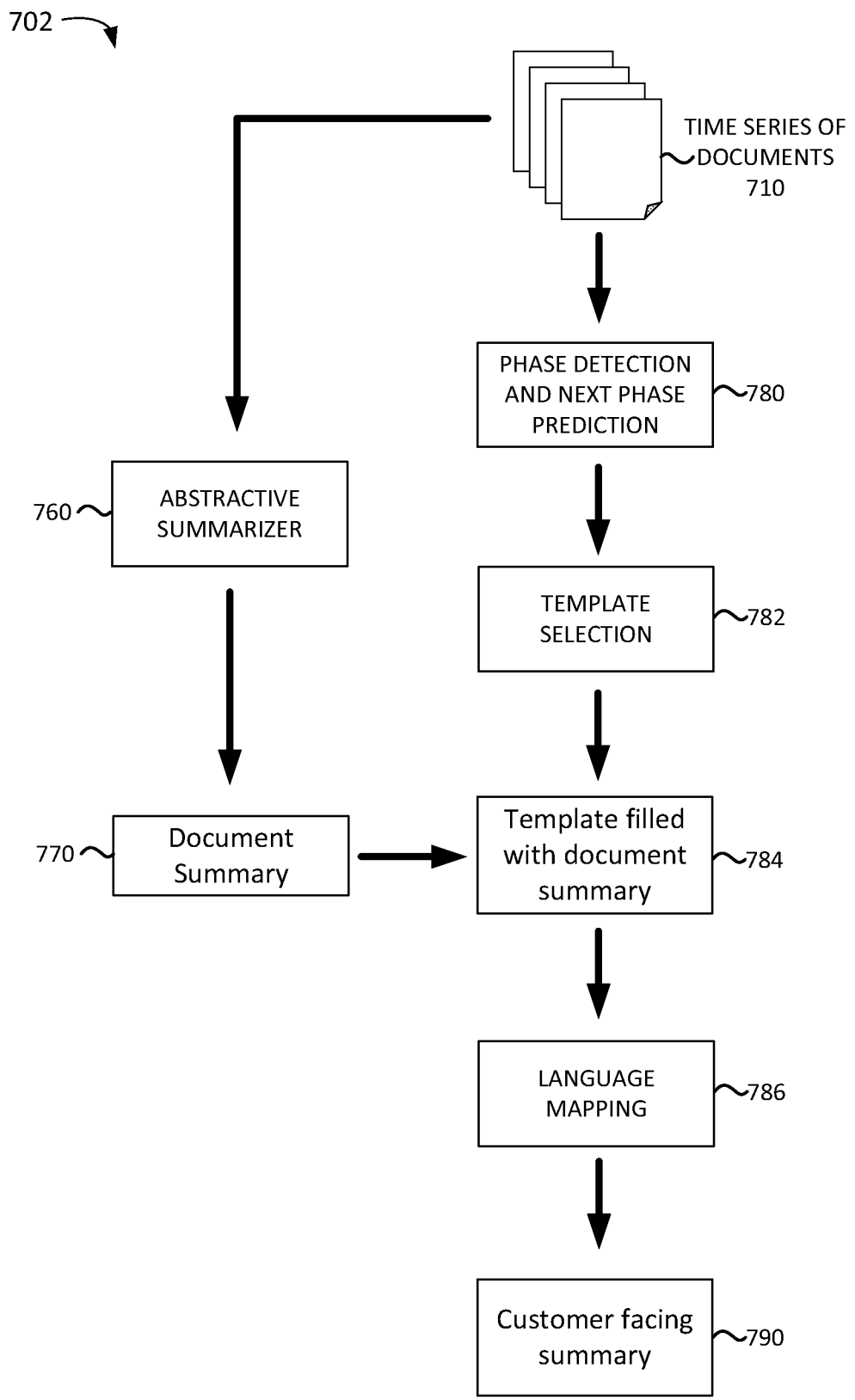

FIG. 7B illustrates a summary generation process 702. As shown in FIG. 7B, summary generation process 702 includes generating document summary 770 using abstractive summarizer 760 on time series of documents 710, as explained above with reference to FIG. 7A. Furthermore, time series of documents 710 may be used to perform phase detection and next phase selection 780, followed by template selection 782. After the template is selected, document summary 770 may be used to fill the selected template to generate a filled template 784. Language mapping 786 may then be performed to replace particular terms or phrases with terms easier to understand by a customer using a language mapping dictionary to generate a customer facing summary 790 that is provided to a customer device (e.g., UE device 110).

Figure 8A:
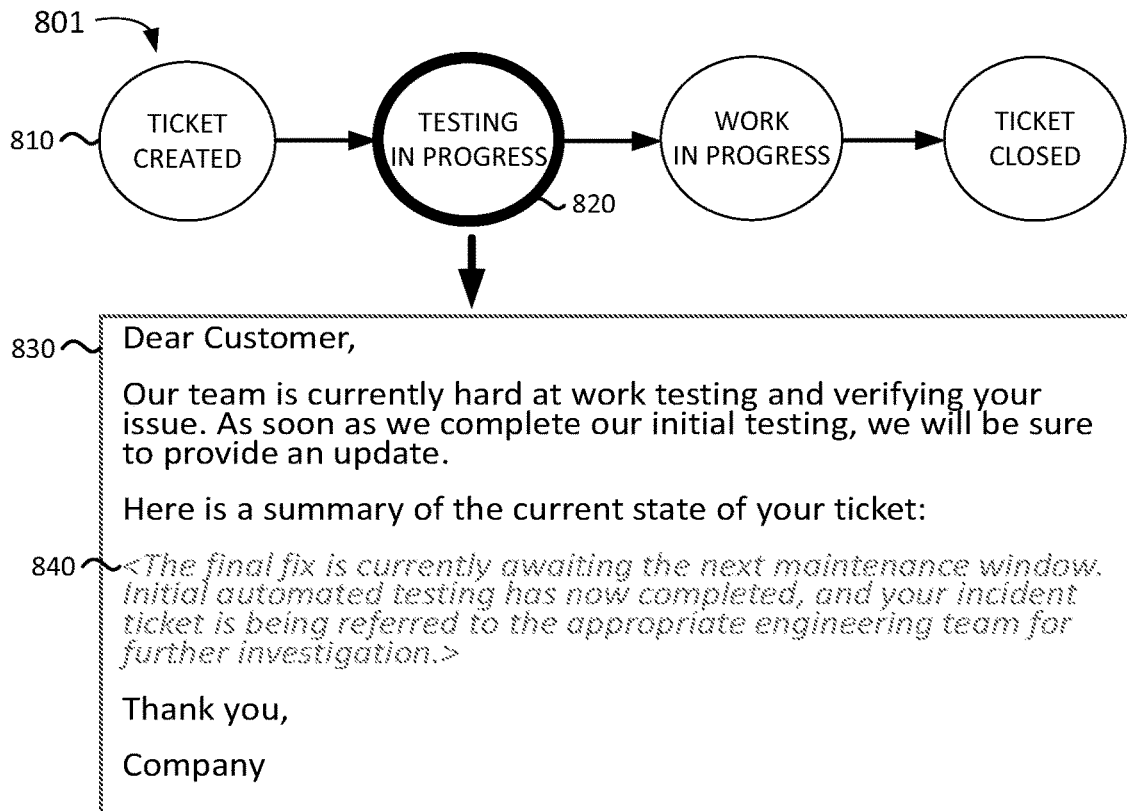
FIGS. 8A and 8B are diagrams of exemplary phase detection and template selection according to an implementation described herein.
Figure 8B:
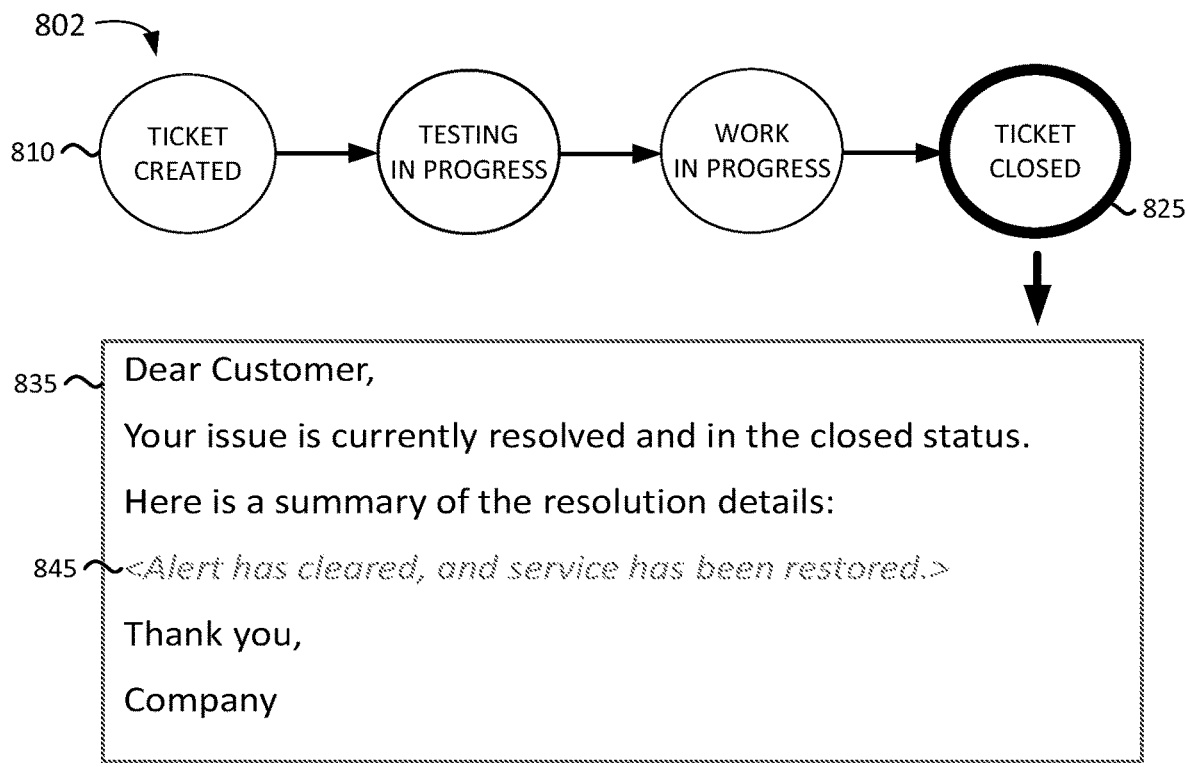

FIGS. 8A and 8B are diagrams of exemplary phase detection and template selection according to an implementation described herein. As shown in FIG. 8A, a first phase detection and template selection 801 may include a ticket phases graph 810 that includes, in this example, a "ticket created" phase, a "testing in progress" phase, a "work in progress" phase, and a "ticket closed" phase. In first phase detection and template selection 810, a first current phase 820 is determined to correspond to the "testing in progress" phase. Based on first current phase 820, a first template 830 is selected describing that the ticket is in a testing phase. A field in first template 830 is filled with a first generated summary 840 describing the summary of the service ticket in more detail.

FIG. 8B illustrates a second phase detection and template selection 802 may include a second current phase 825 is determined to correspond to the "ticket closed" phase. Based on second current phase 825, a second template 835 is selected describing that the ticket has been resolved. A field in second template 835 is filled with a second generated summary 845 describing the summary of the service ticket in more detail.

Figure 9:
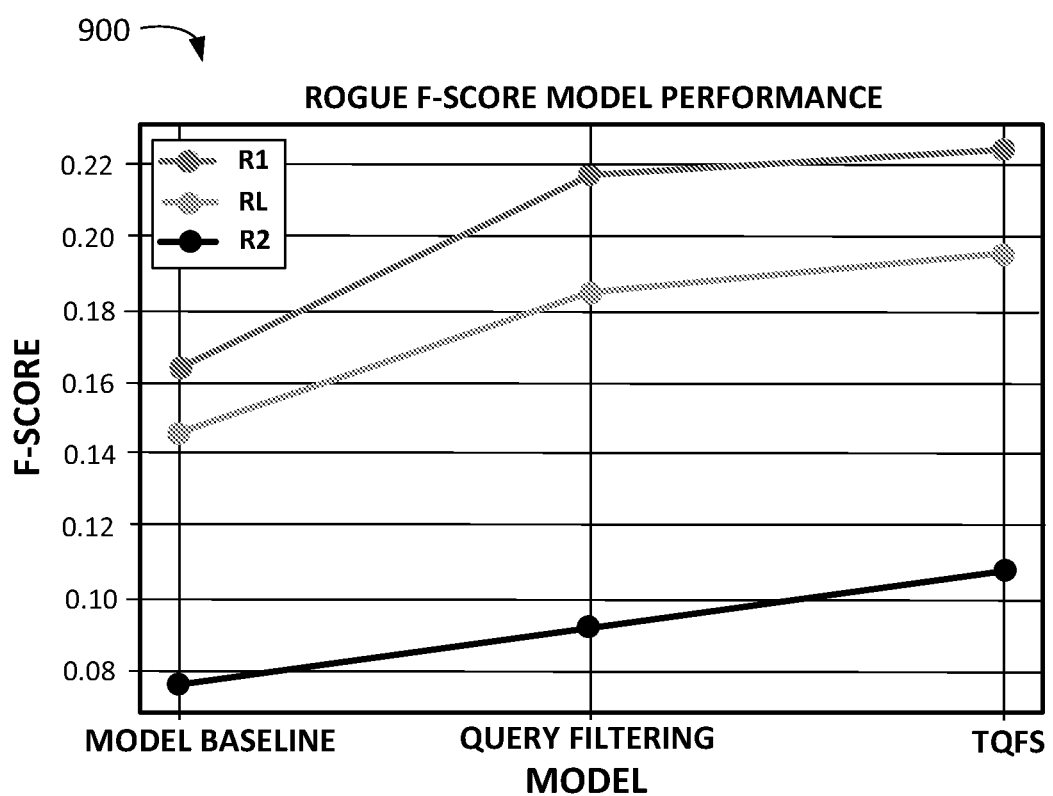
FIG. 9 is a diagram of a plot of model performance scores for different models according to an implementation described herein.

FIG. 9 is a diagram of a plot 900 of model performance scores for different models according to an implementation described herein. As shown in FIG. 9, plot 900 illustrates the performance of three different models, a baseline model, a query filtering model, and a TQFS model. The baseline model uses as input documents provided in reverse chronological order to a trained transformer model to generate a document summary. Thus, the baseline model corresponds to a relevancy model that only considers time and does not rank documents based on similarity to a query set. The query filtering model uses as input documents ranked and sorted based on similarity to a query set (i.e., a QFS model). Thus, the query filtering model corresponds to a relevancy model that only considers query similarity and does not rank documents based on time. The TQFS model uses as input documents ranked and sorted using process 600 of FIG. 6 as described above. Thus, the TQFS model considers both query similarity and time.

Plot 900 illustrates exemplary ROGUE-1 (R1), ROGUE-2 (R2), and ROGUE-L (R-L) scores for the baseline model, the query filtering model, and the TQFS model for document summaries produced by each of the models. The R1 and R2 scores measure overlap of unigrams and bigrams between a reference document corresponding to a document summary produced by a human. The R-L score measures the longest matching sequence of words. The scores shown in plot 900 correspond to an F-score for each metric, wherein the F-score corresponds to a harmonic mean of a Recall score (measuring the overlap based on a reference summary and thus favoring long summaries) and a Precision score (measuring overlap based on the model-generated summary and thus favoring shorter summaries). As shown in plot 900, the TQFS model outperforms both the baseline model and the query filtering model.

FIG. 10 is a first diagram illustrating exemplary document summaries 1000 generated using a document summarizer according to an implementation described herein. As shown in FIG. 10, document summaries 1000 includes a model baseline summary 1010 generated by the baseline model described above with reference to FIG. 9, a query filtering summary 1020 generated by the query filtering model described above with reference to FIG. 9, and a TQFS model summary 1030 generated by the TQFS model described above with reference to FIG. 9. Document summaries 1000 were produced for an incremental update provided four days after a service ticket was initiated. The service ticket for which document summaries 1000 were produced was associated with the following events: a ticket was logged due to an optical fiber outage; the outage was cross-referenced to a higher-level outage; on the day of the incremental update, an optical fiber contractor was sent to investigate the issue at 10 AM Pacific Standard Time (PST); in the investigation, the contractor discovered that the outage resulted from a severed fiber cable due to a fire and that the fiber cable needs to be replaced; and at 11:40 PST, a technician was assigned to work and repair the issue as a result of the investigation.

As shown in FIG. 10, model baseline summary 1010 captures the most recent update from the sequence of events documents associated with the service ticket. Model baseline summary 1010 misses the context required for an incremental summary useful to a customer inquiring about the service ticket. Query filter summary 1020 provides more context in relation to baseline summary 1010, but misses the most recent events. TQFS model summary 1030 provides a more useful and balanced summary by providing the context, which includes the reason for the outage, while focusing on the more recent updates in the ticket documents. Thus, TQFS model summary 1030 balances the most important ticket documents in terms of context information with the most recent ticket documents, which include the most recently available information.

FIG. 11 is a second diagram illustrating exemplary document summaries 1100 generated using a document summarizer according to an implementation described herein. As shown in FIG. 11, document summaries 1100 include a model baseline summary 1110 generated by the baseline model described above with reference to FIG. 9, a query filtering summary 1120 generated by the query filtering model described above with reference to FIG. 9, and a TQFS model summary 1130 generated by the TQFS model described above with reference to FIG. 9. Document summaries 1100 were produced for a service ticket associated with the following events: a customer logs that a communication circuit is down on December 7; testing identifies the affected site and circuit; based on the information identified by the testing, the customer is able to resolve the problem; and to ensure the problem is fully resolved, a technician has been assigned to work with the customer to verify the service.

As shown in FIG. 11, model baseline summary 1110 focuses on the most recent information without providing context information such as a cause of the service ticket and the identified cause of the problem. Query filter summary 1120 provides information about the results of the test and the affected site, but does not include the most recent information indicating that service has been restored and that the problem is solved. TQFS model summary 1130 provides the proper context by summarizing the cause for the service ticket as well as resolution, and also includes the most recent information including the next plan of action. Thus, TQFS model summary 1130 provides a more useful and balanced summary in comparison to model baseline summary 1110 and query filter summary 1120.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 5 and 6, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
receiving, by a device, a status inquiry for a service ticket from a customer device;
obtaining, by the device, a time series of documents associated with the service ticket;
determining, by the device, query scores for particular documents of the time series of documents based on a set of query terms;
determining, by the device, time scores for the particular documents based on timestamps associated with the particular documents;
computing, by the device, document relevancy scores for the particular documents based on a combination of the query scores and the time scores for the particular documents, wherein computing the document relevancy scores for the particular documents based on the combination of the query scores and the time scores for the particular documents includes:
computing a document relevancy score for a particular document as a product of the query score for the particular document and the time score for the particular document;
ordering, by the device, the particular documents based on the computed relevancy scores;
generating, by the device, a document summary by applying a document summarizer to the ordered particular documents, wherein the document summarizer includes a machine learning model trained on a corpus of service ticket documents associated with service tickets in different phases of resolution; and
providing, by the device, the generated document summary to the customer device as a response to the received status inquiry.

2. The method of claim 1, wherein the time series of documents includes documents generated in connection with processing the service ticket, and wherein the service ticket is associated with a provider of communication services.

3. The method of claim 1, wherein determining the query scores for the particular documents includes:
appending the set of query terms to the time series of documents;
determining the term frequency-inverse frequency (TF-IDF) values for the appended set; and
computing the query scores for the particular documents based on a cosine similarity between the set of query terms and the particular documents in the appended set.

4. The method of claim 1, wherein determining the time scores for the particular documents based on the timestamps associated with the particular documents includes:
converting the timestamps to metric values on a metric scale; and
normalizing the metric values based on a minimum timestamp value and a maximum timestamp value.

5. The method of claim 4, further comprising:
applying a decay function to the normalized metric values to determine the time scores.

6. The method of claim 1, wherein generating the document summary by applying the document summarizer to the ordered particular documents includes:
truncating the ordered particular documents to a particular number of ordered documents.

7. The method of claim 1, wherein the document summarizer includes a transformer neural network model.

8. The method of claim 1, wherein documents in the corpus of service ticket documents are generated in connection with processing customer service tickets associated with a provider of communication services.

9. The method of claim 1, wherein providing the generated document summary to the customer device includes:
selecting a summary template based on a phase of resolution associated with the service ticket; and
filling the selected summary template with the generated document summary.

10. A device comprising:
a processor configured to:
receive a status inquiry for a service ticket from a customer device;
obtain a time series of documents associated with the service ticket;
determine query scores for particular documents of the time series of documents based on a set of query terms;
determine time scores for the particular documents based on timestamps associated with the particular documents;
compute document relevancy scores for the particular documents based on a combination of the query scores and the time scores for the particular documents, wherein, when computing the document relevancy scores for the particular documents based on the combination of the query scores and the time scores for the particular documents, the processor is configured to:
compute a document relevancy score for a particular document as a product of the query score for the particular document and the time score for the particular document;
order the particular documents based on the computed relevancy scores;
generate a document summary by applying a document summarizer to the ordered particular documents, wherein the document summarizer includes a machine learning model trained on a corpus of service ticket documents associated with service tickets in different phases of resolution; and
provide the generated document summary to the customer device as a response to the received status inquiry.

11. The device of claim 10, wherein the time series of documents includes documents generated in connection with processing the service ticket, and wherein the service ticket is associated with a provider of communication services.

12. The device of claim 10, wherein, when determining the query scores for the particular documents based on the set of query terms, the processor is further configured to:
append the set of query terms to the time series of documents;
determine the term frequency-inverse frequency (TF-IDF) values for the appended set; and
compute the query scores for the particular documents based on a cosine similarity between the set of query terms and the particular documents in the appended set.

13. The device of claim 10, wherein, when determining the time scores for the particular documents based on the timestamps associated with the particular documents, the processor is further configured to:
convert the timestamps to metric values on a metric scale; and
normalize the metric values based on a minimum timestamp value and a maximum timestamp value.

14. The device of claim 13, wherein the processor is further configured to:
  apply a decay function to the normalized metric values to determine the time scores.

15. The device of claim 10, wherein, when generating the document summary by applying the document summarizer to the ordered particular documents, the processor is further configured to:
  truncate the ordered particular documents to a particular number of ordered documents.

16. The device of claim 10, wherein the document summarizer includes a transformer neural network model.

17. The device of claim 10, wherein documents in the corpus of service ticket documents are generated in connection with processing customer service tickets associated with a provider of communication services.

18. The device of claim 10, wherein, when providing the generated document summary to the customer device, the processor is further configured to:
  select a summary template based on a phase of resolution associated with the service ticket; and
  fill the selected summary template with the generated document summary.

19. A non-transitory computer-readable memory device storing instructions executable one a processor, the non-transitory computer-readable memory device comprising:
  one or more instructions to receive a status inquiry for a service ticket from a customer device;
  one or more instructions to obtain a time series of documents associated with the service ticket;
  one or more instructions to determine query scores for particular documents of the time series of documents based on a set of query terms;
  one or more instructions to determine time scores for the particular documents based on timestamps associated with the particular documents;
  one or more instructions to compute document relevancy scores for the particular documents based on a combination of the query scores and the time scores for the particular documents, wherein the one or more instructions to compute the document relevancy scores for the particular documents based on the combination of the query scores and the time scores for the particular documents include:
    one or more instructions to compute a document relevancy score for a particular document as a product of the query score for the particular document and the time score for the particular document;
  one or more instructions to order the particular documents based on the computed relevancy scores;
  one or more instructions to generate a document summary by applying a document summarizer to the ordered particular documents, wherein the document summarizer includes a machine learning model trained on a corpus of service ticket documents associated with service tickets in different phases of resolution; and
  one or more instructions to provide the generated document summary to the customer device as a response to the received status inquiry.

20. The non-transitory computer-readable memory device of claim 19, wherein the one or more instructions to determine the time scores for the particular documents based on the timestamps associated with the particular documents include:
  one or more instructions to convert the timestamps to metric values on a metric scale;
  one or more instructions to normalize the metric values based on a minimum timestamp value and a maximum timestamp value; and
  one or more instructions to apply a decay function to the normalized metric values to determine the time scores.

* * * * *